US007499181B2

(12) United States Patent
Mirand et al.

(10) Patent No.: US 7,499,181 B2
(45) Date of Patent: Mar. 3, 2009

(54) SYSTEM FOR MEASUREMENT OF PROJECTED TURBULENCE DOWNWIND OF AN AIRCRAFT

(75) Inventors: Pierre Mirand, Toulouse (FR); Michel Lacabanne, Tournefeuille (FR); Nicky Aversa, Montaigut sur Save (FR)

(73) Assignee: AIRBUS France, Toulouse (FR)

( * ) Notice: Subject to any disclaimer, the term of this patent is extended or adjusted under 35 U.S.C. 154(b) by 81 days.

(21) Appl. No.: 11/568,587

(22) PCT Filed: May 23, 2005

(86) PCT No.: PCT/FR2005/050348

§ 371 (c)(1),
(2), (4) Date: Nov. 2, 2006

(87) PCT Pub. No.: WO2006/016075

PCT Pub. Date: Feb. 16, 2006

(65) Prior Publication Data

US 2008/0043234 A1    Feb. 21, 2008

(30) Foreign Application Priority Data

May 25, 2004    (FR) .................................. 04 51018

(51) Int. Cl.
*G01B 9/02* (2006.01)
(52) U.S. Cl. ..................................... 356/519
(58) Field of Classification Search ................ 356/28.5, 356/432, 4.09, 4.01, 519

See application file for complete search history.

(56) References Cited

U.S. PATENT DOCUMENTS

| 4,195,931 | A | * | 4/1980 | Hara ........................... 356/454 |
| 4,433,894 | A | * | 2/1984 | Hanson et al. .............. 359/218 |
| 4,652,122 | A | | 3/1987 | Zincone et al. |
| 5,013,660 | A | * | 5/1991 | Kasuya et al. .............. 435/460 |

(Continued)

FOREIGN PATENT DOCUMENTS

DE    10316762    11/2004

(Continued)

OTHER PUBLICATIONS

Anonymous: "Awiator", Deutsches Zentrum für Luft-Und Raumfahrt, XP 002313357, pp. 1-3, 2004.

(Continued)

*Primary Examiner*—Tarifur Chowdhury
*Assistant Examiner*—Jonathon D Cook
(74) *Attorney, Agent, or Firm*—Oblon, Spivak, McClelland, Maier & Neustadt, P.C.

(57) ABSTRACT

A system for anticipated measurement of turbulence upstream of an aircraft, placed on-board the aircraft, includes a lidar, an image detector, a first processing component, and a second processing component. The lidar transmits an optical beam toward a front of the aircraft and receives a backscattered optical beam. The image detector detects variations in wind speed based on the backscattered optical beam. The first processing component uses a first internal correction algorithm to calculate values of components of the wind speed. The second processing component uses a second external correction algorithm to deliver possible command signals to actuators of at least one aircraft control surface based on the calculated values of the components of the wind speed from the first internal correction algorithm.

9 Claims, 4 Drawing Sheets

U.S. PATENT DOCUMENTS

| | | | |
|---|---|---|---|
| 6,601,801 B1 | 8/2003 | Prow et al. | |
| 6,666,410 B2 | 12/2003 | Boelitz et al. | |
| 7,106,447 B2 * | 9/2006 | Hays | 356/450 |
| 2006/0109470 A1 * | 5/2006 | May | 356/437 |
| 2006/0139657 A1 * | 6/2006 | Baillon et al. | 356/519 |
| 2007/0171397 A1 * | 7/2007 | Halldorsson et al. | 356/28.5 |

FOREIGN PATENT DOCUMENTS

| | | |
|---|---|---|
| WO | WO 2004/003626 | 1/2004 |

OTHER PUBLICATIONS

Hahn K. U., "Coping with Wake Vortex", International Congress of Aerospace Sciences, XP 002313355, pp. 1-14, 2002.

Soreide D., et al., "Coherent Lidar Turbulence Measurement for Gust Load Alleviation", NASA Technical Memorandum 104318, XP 002313356, 1996.

"Les avoins de transport modernes et futures", (Peyrat-Armandy, A. Teknea, pp. 318-397, 1997).

"Imaging techniques and systems: lidar" by P.S. Argall, R. J. Slca; (Encyclopedia of Imaging Science and Technology, J. Hornak, New York, Wiley, pp. 869-889, 2002).

* cited by examiner

SYSTEM FOR MEASUREMENT OF PROJECTED TURBULENCE DOWNWIND OF AN AIRCRAFT

Names of Parties to a Joint Research Agreement

The subject matter of the claimed invention was developed under a joint research agreement named AWIATOR. The parties to this joint research agreement include Airbus France and EADS Deutschland GmbH. Additionally parties include Alenia, CERFACS, CNRS, DLR, TU Munchen, GKN Aerospace Services Ltd., Inasco (Integrated Aerospace & Sciences Corporation O.E.), Instituto Superior Technico, Israel Aircraft Industries, NLR, Nationa Technical University of Athens, ONERA, Sonaca SA, SPASA, Sener, and Universite Catholique de Louvain. The joint research agreement began on July 1, 2002. The claimed invention is directed to a system for anticipated measurement of turbulence upstream of an aircraft including a lidar.

TECHNICAL FIELD

This invention relates to a system for anticipated measurement of turbulence upstream of an aircraft.

Throughout the remainder of the description the aircraft will, by way of example, be considered to be an airplane.

PRIOR ART

In passenger airplanes with more than 100 seats, the means for minimising the effects of turbulence are based on sensors that measure the response of the airplane once it has entered the turbulence or that make it possible to estimate the components of the wind when it reaches the airplane. The minimisation of the effects of turbulence is usually achieved by reducing the factors of load and angular speeds of the airplane subjected to turbulent conditions, reducing the structural vibrations caused, so as to improve the comfort of passengers and, finally, reducing the stresses applied to the structure of the airplane. Measurement means located on the nose of the airplane make it possible to have a phase advance with respect to the time at which the wings are impacted by the wind. However, even on the largest airplanes the distance between its nose and its wings does not allow for a phase advance of more than 100 ms. With the output speed cf current actuators, it is not possible to obtain a total deflection of the surfaces, and consequently optimal efficacy in particular of the laws that reduce the loads or increase passenger comfort. Such efficacy can be increased by installing faster actuators or by keeping the current actuators and by measuring the wind speed in front of the apparatus. Indications on the sensors and the methods currently used in civil aviation can be found in a large number of documents. For example, the document referenced [1] at the end of the description can be cited.

It should be noted that the use of a lidar for reducing the consequences of an encounter by the aircraft of vertical turbulence is envisaged in the document referenced [2].

DISCLOSURE OF THE INVENTION

To overcome the disadvantages of the conventional systems, the system of the invention aims to measure, using a lidar (LIDAR: "Light Detection and Ranging"), the wind speed in front of the aircraft at a distance sufficient to enable the actuation, by means of the flight control system, of the air control surface in phase advance with respect to the systems using conventional data (ADC: "Air Data Computer", IRS: "Inertial Reference System", and so on). Thus, the invention relates to a system for anticipated measurement of turbulence upstream of an aircraft, placed on-board the aircraft.

An example embodiment of such a system includes a lidar, an image detector, a first processing component, and a second processing component. The lidar transmits an optical beam toward a front of the aircraft and receives a backscattered optical beam. The image detector detects variations in wind speed based on the backscattered optical beam. The first processing component uses a first internal correction algorithm to calculate values of components of the wind speed. The second processing component uses a second external correction algorithm to deliver possible command signals to actuators of at least one aircraft control surface based on the calculated values of the components of the wind speed from the first internal correction algorithm.

The system of the invention differs from he document referenced [2] in particular by virtue of the following features:

the direct detection (the document referenced [2] envisages only a coherent detection), and the correction of the effects of the lateral and axial speeds of the disturbances. Recent experience has shown that the effects of these components were beginning to be affected, first, due to the increasingly effective correction of the vertical components and, seconds due to the elongation of airplanes (the document referenced [2] envisages only a correction of the vertical speed).

The system of the invention provides a number of advantages:

the use of an ultraviolet lidar makes it possible to obtain better performances than with an infrared lidar. This lidar can thus be produced with an infrared diode and a frequency multiplier or with an ultraviolet diode. Documentation on lidar technologies is provided in the document referenced [3].

the use of a direct detection system makes it possible to take advantage of the Mie and Rayleigh backscattering (backscattering on aerosols and molecules). The measurement in clear air is thus made possible. Such a direct detection is defined in the document referenced [3].

the use of a very short lidar command pulse (10 ns) makes it possible to obtain a very small measurement volume, and thus to have data on speed that is well localised in space.

the use of a single laser, with scanning over a plurality of points so as to obtain speed data (the Doppler lidar allows speed data to be obtained only in the line or sight of the laser). A possible scanning system is described in the document referenced [4].

the integration of this lidar in an aircraft makes it possible to obtain the three components of the wind speed in time phase advance of d/V, with d being the sighting distance and V being the airplane speed. The recovered speed is in an area that the aircraft will pass through, upstream thereof, at a distance greater than or equal to 500 feet (around 150 m). Thus, the measurement is representative of the disturbance encountered, assuming a stationary state over the duration d/V.

the use of the wind speed data in combination with the aircraft parameters makes it possible to determine the orders to be applied to the control surfaces:

to reduce the sizing charges: the largest loads that will be applied to the aircraft in the encounter with exceptional atmospheric turbulence are reduced. Thus, it is possible to reduce the mass of the aircraft structure.

to reduce the fatigue load: the stresses applied to the wings are reduced, if turbulence is encountered, so that the resulting stresses correspond to lower fatigue cycles, and the lifetime of the structure is thus increased.

to improve passenger comfort: in this context, the response characterised by the accelerations of responsive body modes is reduced, so that even when minor turbulence is encountered, the passengers are not disturbed by the vibrations.

the law of control associated with the detection system can be a law of open-loop or closed-loop control.

it is possible to apply the orders most suitable for achieving the envisaged control of the actuators of the aircraft flight control surfaces.

DETAILED DESCRIPTION OF SPECIFIC EMBODIMENTS

Figure 1:
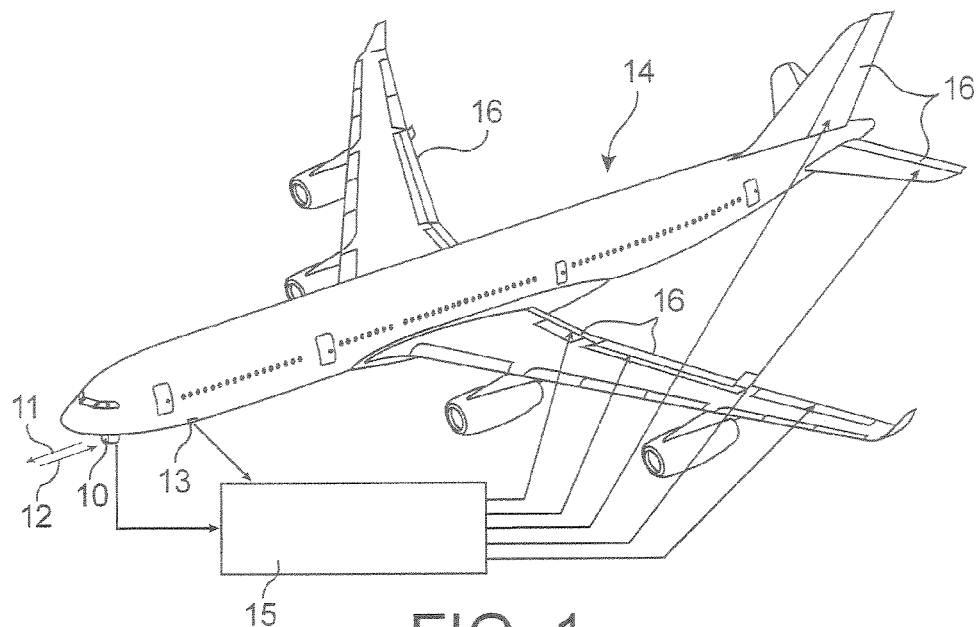
FIG. 1 shows the system of the invention provided in an airplane.

As shown in FIG. 1, in the system of the invention, the signals issued by a lidar 10, which transmits a laser beam 11 forward and receives the backscattered beam 12, as well as signals issued by sensors 13 of the airplane 14, are entered into the flight control computers 15, which give the orders to the flight control surfaces 16.

Figure 2:
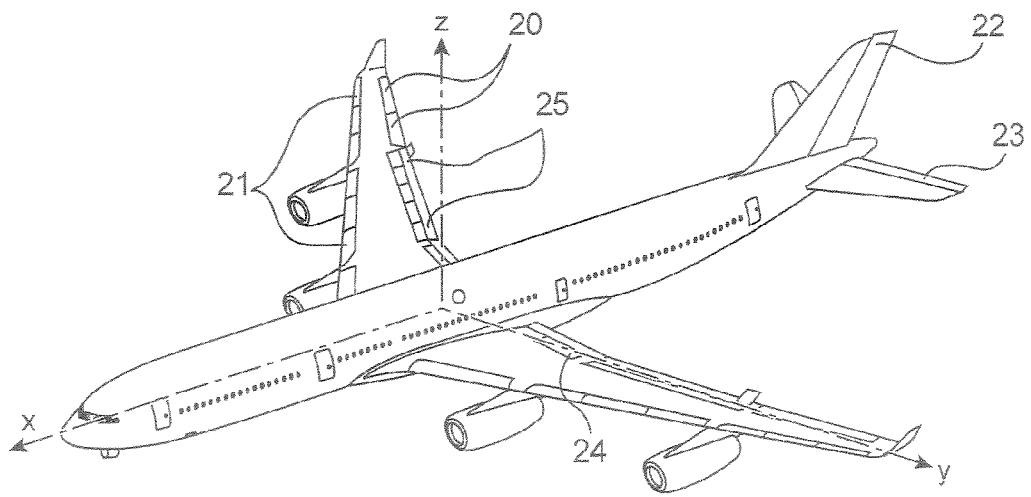
FIG. 2 shows the various flight control surfaces of an airplane.

As shown in FIG. 2, these flight control surfaces 14 can thus be:

the wings 20, which are control surfaces for roll or lateral control, which give a moment with respect to the axis Ox (airplane axis), the leading edge flaps 21, which are used at take-off and approach to back up the stall position of the wings, the rudder 22, which is a yaw control surface or a rudder, which gives a moment with respect to the axis Oz, the elevators 23, which are pitch control surfaces or elevators, which give a moment with respect to the axis Oy, the "spoilers" 24, which are used primarily at larding to keep the airplane on the ground and to increase the braking efficacy, and which can be used n flight for emergency landings, the flaps 25, which are used at take-off and in approach to obtain additional lift at low speed, rapid control surfaces, such as mini-TEDs ("Training Edge Devices")(or "sakuri" (see the document referenced [6]), which can also be used for direct control of the lift.

In this figure, the point O is the centre of gravity of the airplane.

Figure 3:
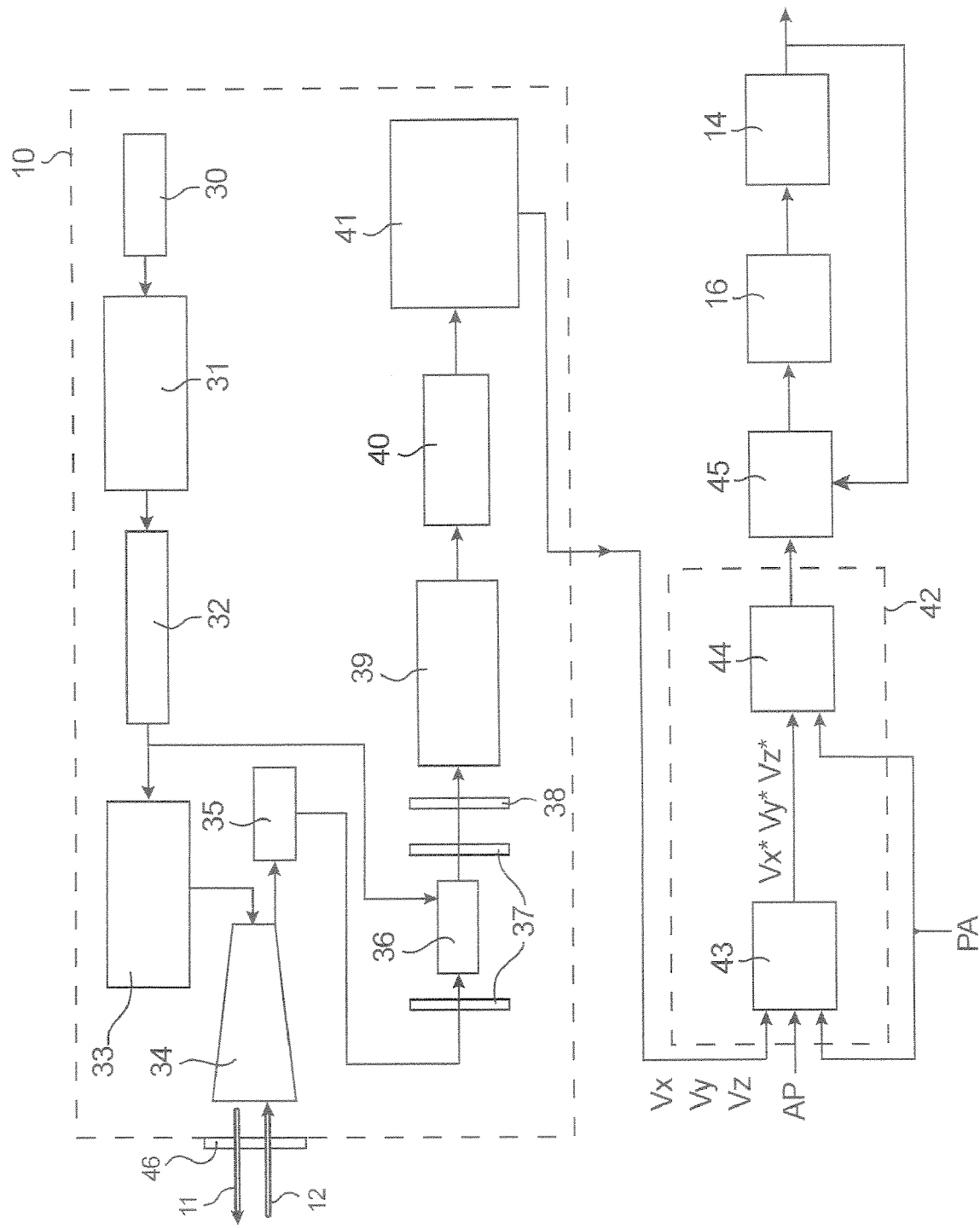
FIG. 3 shows the operating principle of the system of the invention in an open loop.
Figure 4:
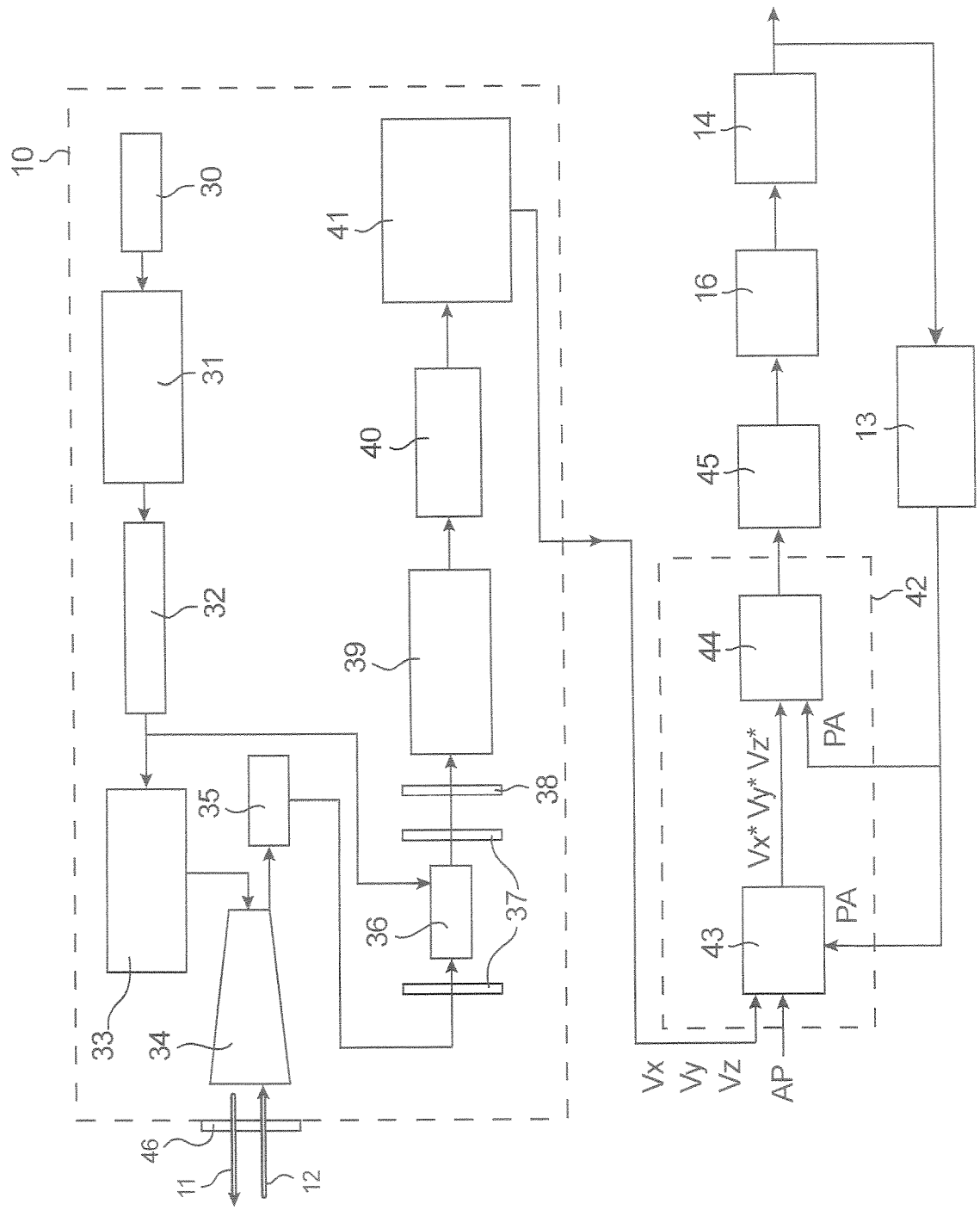
FIG. 4 shows the operating principle of the system of the invention in a closed loop.

As shown in FIGS. 3 and 4, the system of the invention includes a lidar 10, which is made of optical transmission and reception portions, and a reception portion.

The optical portion includes:
a laser 30,
an optional frequency multiplier 31,
an obturator 32,
a rotating mirror and prism system 33,
a telescope 34,
a window treated for the laser frequency selected 46, and
an optical fibre 35.

The reception portion includes:
a Fabry-Perot etalon 36 placed between two optical lenses 37,
a filter 38,
an image intensifier 39, and
an image detector 40 and a processing component 41 implementing the first algorithm (internal corrections).

The system of the invention is connected to the flight control computers 42, which perform:

a correction of speeds 43 using the calculated wind speeds $V_x$, $V_y$ and $V_z$, the pilot actions AP, and the quasi-static airplane parameters PA (mass, centre of gravity, Vtas, Vcas, angular speeds), a computer 44, which determines the flight control surface orders to be applied on the basis of the angular speeds and accelerations, and the airplane control laws 45, which use the "quasi-static" airplane parameters PA (mass, centre of gravity, Vtas, Vcas, angular speeds).

The optical transmission portion makes it possible to deliver very short pulses (for example on the order of 10 ns) to the laser 30, with the energy desired to obtain a desired measurement distance. The laser beam used is advantageously located in the near ultraviolet, and makes it possible to obtain a good signal quality, owing to a low wavelength.

Figure 5:
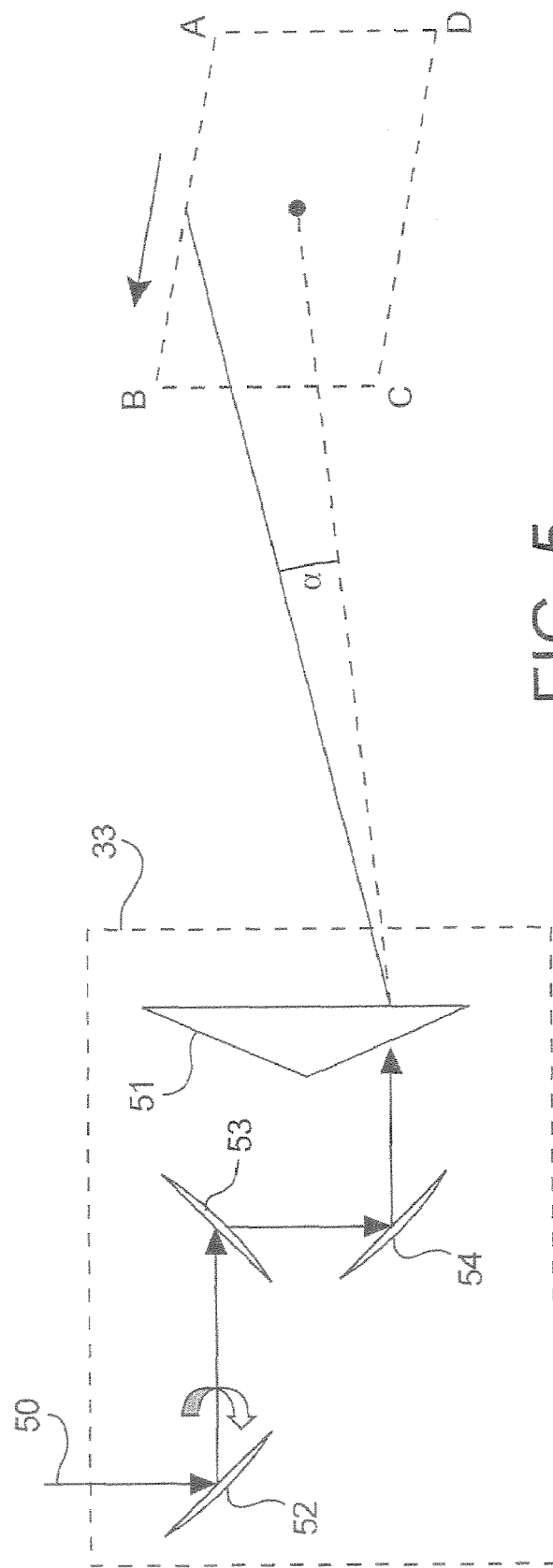
FIG. 5 shows the scanning system of the system of the invention.

The output beam 11 is then separated by the rotating mirror and prism system 33. This system 33, as shown in FIG. 5, sends a beam 50 over a prism 51 by means of mirrors 52, 53 and 54 and makes it possible to separate the output beam into a beam that will alternately scan one direction out of four possible directions, and thus measure the speed according to four directions at $+/-\alpha°$ with respect to the airplane axis Ox: the larger the angle, the greater the precision. For example, 10° is chosen. It is decided to use a new direction every 15 ms. A full rotation ABCD therefore takes place in 60 ms.

The beam then passes through the telescope 34, which preserves a beam of very low divergence (on the order of 1 mrad) This beam then passes through a treated window 46 so as to have a high transmission factor or the wavelength selected, and enters the atmosphere.

The transmitted beam 11 impacts the particles and molecules in the atmosphere located in its path. A portion of this signal is then backscattered (signal 12), and is recovered by the telescope 34. The obturator 32 acts as a shutter to selectively block light from the laser 30 that is output by the frequency multiplier. Thus, by blocking light at a predetermined time, the obturator 32 makes it possible to recover only the data contained in a time volume between 2d/c and 2(d/c +τ), with d: desired sighting distance, c: speed of light, τ duration of each pulse.

In the optical reception portion, the data contained in the beam 12 is separated by 15-ms packets, corresponding to a particular direction.

The beam received then passes through the optical fibre 35 so as to enter the reception portion.

This reception portion constitutes the data processing core. It consists of the Fabry-Perot etalon 36, which makes it possible to create Interference circles. The image detector 40, for example a CCD camera, then makes it possible to film the size variations of the different circles, which are associated with the variations in wind speed upstream of the airplane.

The first algorithm processes the data on variations in diameter of the circles issued from these raw images. Other parameters internal and external to the laser system (temperature, transmission power position of the telescope with respect to the airplane references, etc.) are also necessary to calculate the value of the components of the relative speed of the wind. A data processing system is thus described in the document referenced [5].

These speed components are then transmitted to the airplane computers 42, which have data on the pilot actions AP and the current state of the airplane (for example, the load factors, the angular speeds of the airplane, etc.). A second algorithm then uses the speed data obtained from the first algorithm, and the airplane data (Tas or "True Air Speed", pilot orders, load factors (primarily nz) to determine the amplitude of the disturbance encountered.

This second algorithm makes it possible:

to "subtract" the speeds induced by the mechanical movement of the flight of the airplane from speeds Vx, Vy and Vz, and to develop the flight control surface orders enabling the airplane responses to be minimised and the loads to be reduced according to the choices made.

This second algorithm can, as shown in FIGS. 3 and 4, be used, with some modifications, in an open loop or in a closed loop.

1) Open loop:

In this case, as shown in FIG. 3, the pure turbulence data is used to give an order to the flight control surfaces 16 of the airplane 14. There is no feedback with the inertial or anemometric data of the airplane 14.

To provide an example, let us consider the airplane in cruising motion, with nz=1 g, with a known Vtas speed. The lidar measures a speed V, which can be equal or not to Vtas. If there is a vertical wind Vzvent, we have Vzvent=Vzalgo (Vz algorithm)-Vztas. This vertical wind has an influence on the lift, the incidence and the load factor of the airplane.

The second algorithm makes it possible, after having calculated the speed components of the wind, to minimise the impact of this wind on the airplane.

To do this, a flight control surface order is given. In this example, the flight control surfaces are deflected by an angle x°, which make it possible to anticipate the effect of the wind on the airplane. In its simplest form, as described in the example, the order given to the flight control surfaces in an open loop may have the form:

$$\delta Q = K(\delta) Vzvent$$

2) Closed loop:

In this case, as shown in FIG. 4, we use the data on the components of the wind given by the lidar, as well as the effect of an order given to the flight control surfaces 16 on the airplane behaviour, using all of the necessary sensors 13 existing on the airplane 14.

Without making simplifying assumptions, and taking into account three components of the wind, the order given to the flight control surfaces can have the form:

$$\begin{pmatrix} \delta p \\ \delta q \\ \delta r \end{pmatrix} = \begin{pmatrix} k11(\omega) & k12(\omega) & k13(\omega) \\ k21(\omega) & k22(\omega) & k23(\omega) \\ k31(\omega) & k32(\omega) & k33(\omega) \end{pmatrix} \begin{pmatrix} Vxvent \\ Vyvent \\ Vzvent \end{pmatrix} + K_1(\omega) \begin{pmatrix} nx - nxpilote \\ ny - nypolote \\ nz - nzpolote \end{pmatrix} + K_2(\omega) \begin{pmatrix} p - ppilote \\ q - qpilote \\ r - rpilote \end{pmatrix}$$

with $\omega$: pulsation.

$\delta p$: deflection angle of the roll control surfaces.

$\delta q$: deflection angle of the pitch control surfaces.

$\delta q$: deflection angle of the yaw control surfaces.

nx, ny, xz: load factors according to X, Y and Z.

The various coefficients kii may or may not contain activation logics depending on the desired goal. The matrices $K_1$ and $K_2$ (matrices 3×3) can also contain activation logics and delays.

It is clear that what is shown here is an example, and that the description may be extended to other surfaces and types of control. While specific terms are used here, this is done so for a descriptive, and non-limiting, purpose.

REFERENCES

[1] "Les avions de transport modernes et futures" (Peyrat-Armandy, A, Teknéa, pages 315-325, 1997)

[2] "Coherent lidar turbulence measurement for gust load alleviation" by D. Loreide, R. K. Bogne, L. D. Ehernberger, H. Bagley (NASA-TM-104318, August 1996)

[3] "Imaging techniques and systems: lidar" by P. S. Argall, R. J. Sica (Encyclopedia of Imaging Science and Technology, J. Hornak, New York, Wiley 869-889, 2002)

[4] WO 2004/003626

[5] DE 10316762

[6] U.S. Pat. No. 6,501,801

The invention claimed is:

1. A system for anticipated measurement of turbulence upstream of an aircraft, placed on-board the aircraft, comprising:

a lidar to transmit an optical beam toward a front of the aircraft and to receive a backscattered optical beam, wherein the lidar includes an optical transmission and reception portion, comprising:

a laser that produces the optical beam;

an obturator that blocks the optical beam at a predetermined timing;

a rotating mirror and prism system that separates the optical beam such that the separated beam can scan different directions;

a telescope that prevents divergence of the separated beam output by the rotating mirror and prism system;

a window treated for a selected laser frequency and positioned such that the separated beam output by the telescope passes through the window and enters an atmosphere upstream of the aircraft; and an optical fiber to receive the backscattered optical beam after the backscattered beam passes through the window and the telescope;

an image detector to detect variations in wind speed based on the backscattered optical beam;

a first processing component using a first internal correction algorithm to calculate values of components of the wind speed; and a second processing component using a second external correction algorithm to deliver command signals to actuators of at least one aircraft control surface based on the calculated values of the components of the wind speed from the first internal correction algorithm.

2. A system according to claim 1, wherein the lidar is an ultraviolet lidar.

3. A system according to claim 1, further comprising a frequency multiplier at an output of the laser.

4. A system according to claim 1, wherein the optical transmission and reception portion includes:

a Fabry-Perot etalon placed between two optical lenses to create interference circles associated with the variations in the wind speed based on the backscattered optical beam, wherein the image detector films size variations in the interference circles to detect the variations in the wind speed.

5. A system according to claim 1, wherein the values of the components of the wind speed calculated by the first internal correction algorithm include a vertical component, a lateral component, and an axial component.

6. A system according to claim 1, wherein the at least one aircraft control surface includes wings, flaps, a rudder, spoilers, and rapid control surfaces.

7. A system according to claim 1, wherein the command signals are also based on pilot actions and quasi-static airplane parameters.

8. A system according to claim 7, wherein the quasi-static airplane parameters include mass, center of gravity, true air speed, and angular speed of the aircraft.

9. A system according to claim 1, wherein the optical beam alternatively scans one direction out of four scanning directions.

* * * * *